(12) United States Patent
Haering, Jr. et al.

(10) Patent No.: US 9,599,497 B1
(45) Date of Patent: Mar. 21, 2017

(54) BACKGROUND ORIENTED SCHLIEREN USING CELESTIAL OBJECTS

(71) Applicant: The United States of America as Represented by the Administrator of NASA, Washington, DC (US)

(72) Inventors: Edward A Haering, Jr., Lancaster, CA (US); Michael A Hill, Rosamond, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/811,994

(22) Filed: Jul. 29, 2015

(51) Int. Cl.
   *G01C 1/00*   (2006.01)
   *G01F 1/708*  (2006.01)
   *G01P 3/38*   (2006.01)

(52) U.S. Cl.
   CPC .............. *G01F 1/7086* (2013.01); *G01P 3/38* (2013.01)

(58) Field of Classification Search
   CPC .................................. G01F 1/7086; G01P 3/38
   See application file for complete search history.

(56) References Cited

U.S. PATENT DOCUMENTS 5,534,995 A * 7/1996 Weinstein .............. G01N 21/45
                                              356/129

OTHER PUBLICATIONS

Hargather, Michael John and Gary S. Settles. "Natural-Background-Oriented Schlieren Imaging". Research Article. Published Jul. 9, 2009. http://infohost.nmt.edu/~Mjh/Pubs/2010-Hargather-EF.pdf.*
Richard, H. and M. Raffel. "Principle and Applications of the Background Oriented Schiliern (BOS) Method". Institute of Physics Publishing: Measurement Science and Technology, Dec. 2001 1576-1585. file:///C:/Users/sabraham/Downloads/e10925%20(1).pdf.*
Bahrawi, M.; N. Farid and M. Abdel-Hady. "Speckle Cross-Correlation Method in Measuring Fine Surface Displacements". Journal of Atomic, Molecular, and Optical Physics. vol. 2012 (2012). http://www.hindawi.com/journals/jamp/2012/976376/.*
Cohen, Howard L. "Solar Images Taken with Calcium K-Line Filters". Jan. 2014 (Rev. Mar. 2015). http://www.astroadventures.net/cohen/articles/K-Line%20Images%20of%20Sun.pdf.*

* cited by examiner

*Primary Examiner* — Luke Ratcliffe
*Assistant Examiner* — Samantha K Abraham
(74) *Attorney, Agent, or Firm* — Mark Homer

(57) ABSTRACT

The present invention is a system and method of visualizing fluid flow around an object, such as an aircraft or wind turbine, by aligning the object between an imaging system and a celestial object having a speckled background, taking images, and comparing those images to obtain fluid flow visualization.

10 Claims, 5 Drawing Sheets

BACKGROUND ORIENTED SCHLIEREN USING CELESTIAL OBJECTS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to a system and method to obtain density changes in fluid flow around crafts and objects and more particularly to using Schlieren flow visualization.

2. Description of the Related Art

It is important to be able to characterize fluid flow, such as air current, around aircraft and other objects (such as windmills) in order to maximize efficiency of these systems. One method of doing so is to use Schlieren flow visualization. Schlieren flow visualization is based on the deflection of light by a refractive index gradient. The index gradient is directly related to flow density gradient. The deflected light is compared to undeflected light at a viewing screen. The undisturbed light is partially blocked by a knife edge. The light that is deflected toward or away from the knife edge produces a shadow pattern depending upon whether it was previously blocked or unblocked. This shadow pattern is a light-intensity representation of the expansions (low density regions) and compressions (high density regions) which characterize the flow.

Currently, this method has been used in wind tunnels to characterize fluid flow around aircraft models and engine components. This is done via the flow visualization technique described above. More specifically, the method uses Schlieren photography to obtain fluid flow data. Schlieren photography is similar to the shadowgraph technique and relies on the fact that light rays are bent whenever they encounter changes in density of a fluid. Schlieren systems are used to visualize the flow away from the surface of an object. One example of a Schlieren system uses two concave mirrors on either side of the test section of the wind tunnel. A mercury vapor lamp or a spark gap system is used as a bright source of light. The light is passed through a slit which is placed such that the reflected light from the mirror forms parallel rays that pass through the test section. On the other side of the tunnel, the parallel rays are collected by another mirror and focused to a point at the knife edge. The rays continue on to a recording device like a video camera.

If the parallel rays of light encounter a density gradient in the test section, the light is bent, or refracted. If a shock wave has been generated by a model placed in the supersonic flow of the wind tunnel, the ray of light passing through the shock wave is bent. This ray of light does not pass through the focal point, but is stopped by the knife edge. The resulting image recorded by the camera has darkened lines that occur where the density gradients are present. The model completely blocks the passing of the light rays, so a black image of the model is seen. But more importantly, the shock waves generated by the model are now seen as darkened lines on the image. Hence, the method allows one to visualize shock waves.

However, when using the method in a wind tunnel, a user will not be getting fluid flow visualization of an aircraft or other object's actual performance in the field, but, rather, a simulation. In addition, wind tunnel testing is very expensive.

It has also been contemplated to simply use the edge of the sun as a background for a Schlieren fluid flow analysis of aircraft fluid flow. However, simply using the edge of the sun provides an extremely rough estimate of the fluid flow.

Therefore, it is desired to provide a cost effective system and method to obtain relatively detailed fluid flow characterization around aircraft and other objects during actual operation.

SUMMARY OF THE INVENTION

Accordingly, it is an objective of this invention to provide fluid flow characterization around aircraft and other objects during their operation.

It is another objective to provide a simple, cost-effective system and method to provide such fluid flow characterization.

This invention meets these and other objectives related to characterizing density changes in fluid flow from craft and other objects by providing an improved system for visualizing fluid flow around an object in operation, comprising a celestial object having a speckled background and an imaging system focused on the celestial object. An aircraft or other object, having a fluid flow around it, is placed between (or moves between) the imaging system and the celestial object. Finally, an image processing system, capable of comparing an image of the celestial object background with no fluid flow to one or more images of the fluid flow in front of the celestial object background, is employed. The invention also includes a method of using the above described system to characterize fluid flow around an aircraft or other object.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

Figure 1:
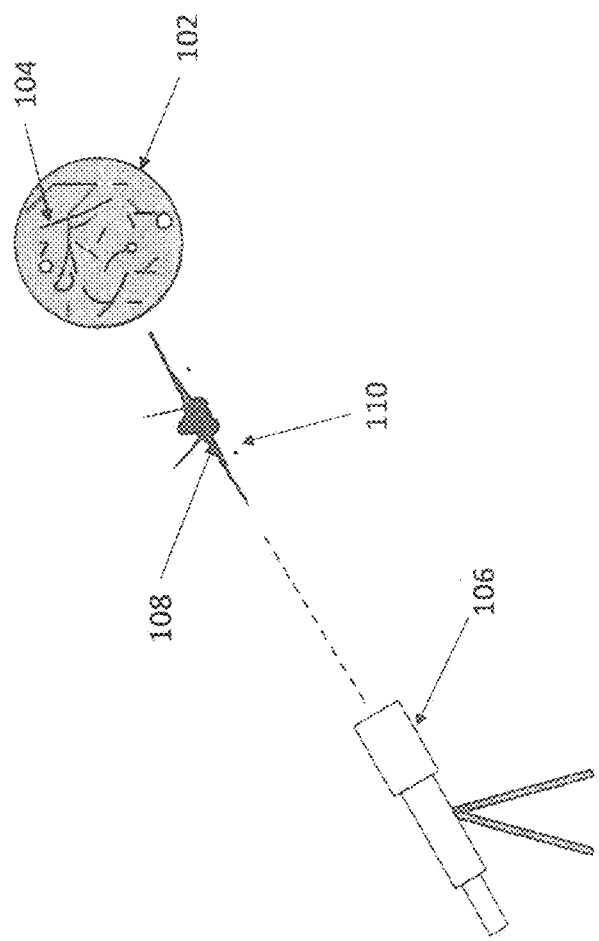
FIG. 1 depicts a simplified embodiment of the system described herein.

The invention proposed herein comprises a system that utilizes objects in the sky as a background for performing Background Oriented Schlieren (BOS) on an aircraft or other object in front of celestial objects. BOS is a flow visualization technique which uses digital image post-processing to view the fluid density gradients around objects. The technique is performed by recording two images of a featured background. One image is taken through relatively constant air density, and the second image is taken through the flow that is desired to be visualized. Refracted light rays can be detected measuring how many pixel features in the background have moved between the two images. This amount of movement corresponds to the 2nd derivative of fluid density, much like the traditional shadowgraph.

To acquire pictures, an imaging system must be focused on the background object, such as the sun, moon, stars, clouds, etc, and the desired flow to be visualized occurs in the optical path between the imaging system and the background. Image processing is performed by comparing the reference background image to each frame in which the flow to be visualized is occurring. To compare the image pairs, the images must first be stabilized, so the background in each frame does not change location within the frame. To achieve this the flow frames must be shifted to match the location of the reference background frame.

After each frame is aligned with the reference background frame, changes between the reference background and each flow frame can be detected using established algorithms such as digital cross-correlation or optical flow techniques. Cross-correlation compares pixel patterns between frames to quantify the magnitude each pixel group as shifted as a result of the refracted light. Optical flow will compare the intensity of the reference image to the intensity of the flow image, to determine changes between the two.

Once each frame has been compared to the reference background frame, a median of the magnitudes of the differences for all the frames is taken to result in a single image which greatly reduces the noise when compared to each individual image.

It should be understood by those skilled in the art that when the application discusses aircraft or "other objects" this simply refers to objects that have fluid flow around them (such fluid flow is normally air, but could be other compressible fluids such as other gases). Examples of such objects include both powered objects such as aircraft and spacecraft and unpowered objects such as gliders, wind turbines, and the like. It should also be understood that when discussing a celestial object that the term, as used herein, is not limited to those objects outside the Earth's atmosphere and could include objects both within and outside the Earth's atmosphere. In addition, the phrase "having a speckled background" as used herein means visual irregularities that are capable of being used in Schlieren flow visualization techniques. Those skilled in the art will understand the size and location of such irregularities necessary for such techniques and the word "irregularities" does not mean that the pattern thereon such objects need be irregular (the pattern used for the invention described herein can be regular and merely is used to mean background shapes which can be any shape, size, etc. as long as it is capable of being used for Schlieren flow visualization).

Further, when a celestial object is said to "have a speckled background" herein, this can mean that the object can either have a visually natural speckled pattern, such as craters, etc. on the moon, or the object would need to be capable of creating a speckled pattern within an image thereon, such as using an optical filter in an imaging system that shows the pattern on the celestial object.

Finally, the phrase speckled pattern used herein is merely synonymous with the phrase visual irregularities as defined above.

Referring to FIG. 1, the invention comprises a celestial object 102 having a speckled background 104. An imaging system 106 is focused on the speckled background 104 that is capable of taking images/pictures of the celestial object 102. An object 108 that includes a fluid flow 110 around it is located so the fluid flow 110 is between the imaging system 106 and the celestial object 102 so that the fluid flow 110 is in the optical path of the imaging system 106 between it and the speckled background 104.

Figure 4B:
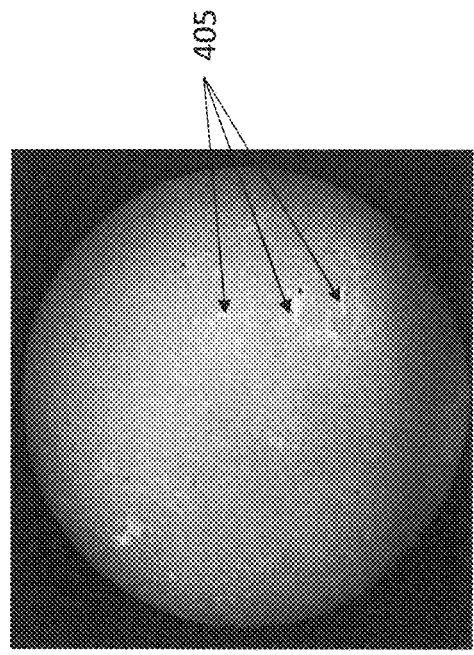
FIG. 4B depicts the sun as a celestial object that may be used for the present invention.
Figure 4A:
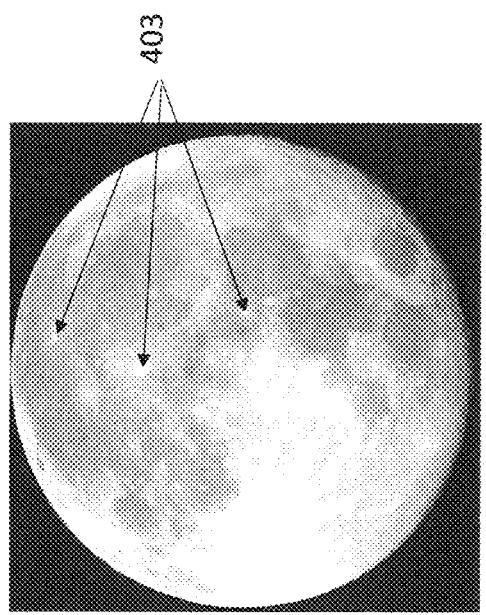
FIG. 4A depicts the moon as a celestial object that may be used for the present invention.

The celestial object 102 chosen to be used in the present invention merely needs to be able to be imaged with a speckled background 104. Some celestial objects 102 that may be used in the invention include the sun, the moon, clouds, or stars. The preferred celestial objects 102 for use in the invention are the sun or the moon due to their size, location, and their inherently speckled backgrounds 104. FIGS. 4A and 4B depict examples of the moon and sun respectively showing speckled backgrounds 403, 405 that could be used in the present invention. The arrows in the FIGS. merely reflect examples of speckles or irregularities 403, 405; it would be obvious to one skilled in the art that there are potentially hundreds of such speckles in these FIGS. One other note of interest is that the speckles 405 in FIG. 4B are not in the visible spectrum as discussed further below.

Returning to FIG. 1, the objects 108 discussed herein are those that have a fluid flow 110 moving around them. In addition, the objects 108 used in the present invention are those that can be located so their fluid flow 110 is within the field of view of the imaging system 106 and the chosen celestial object 102. Examples of objects 108 of the present invention include aircraft, spacecraft, and wind turbines.

Figure 2:
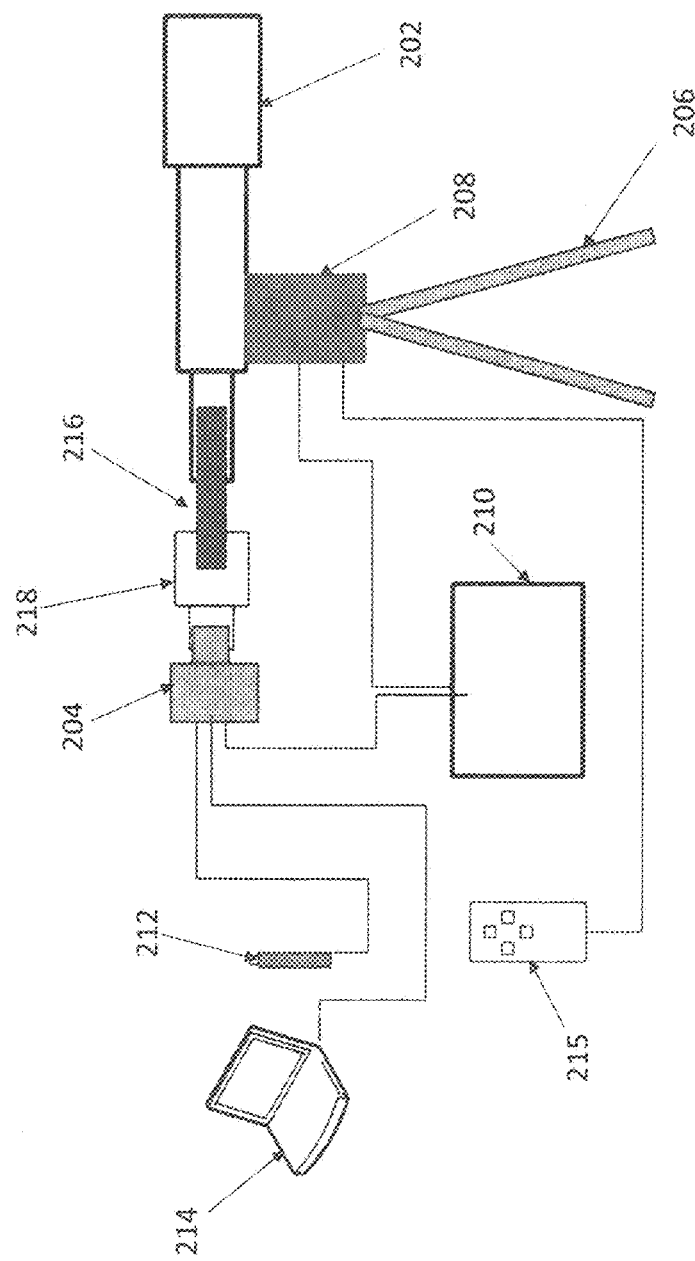
FIG. 2 depicts an embodiment of an imaging and processing system for an embodiment of the invention using the sun as a celestial object.
Figure 3:
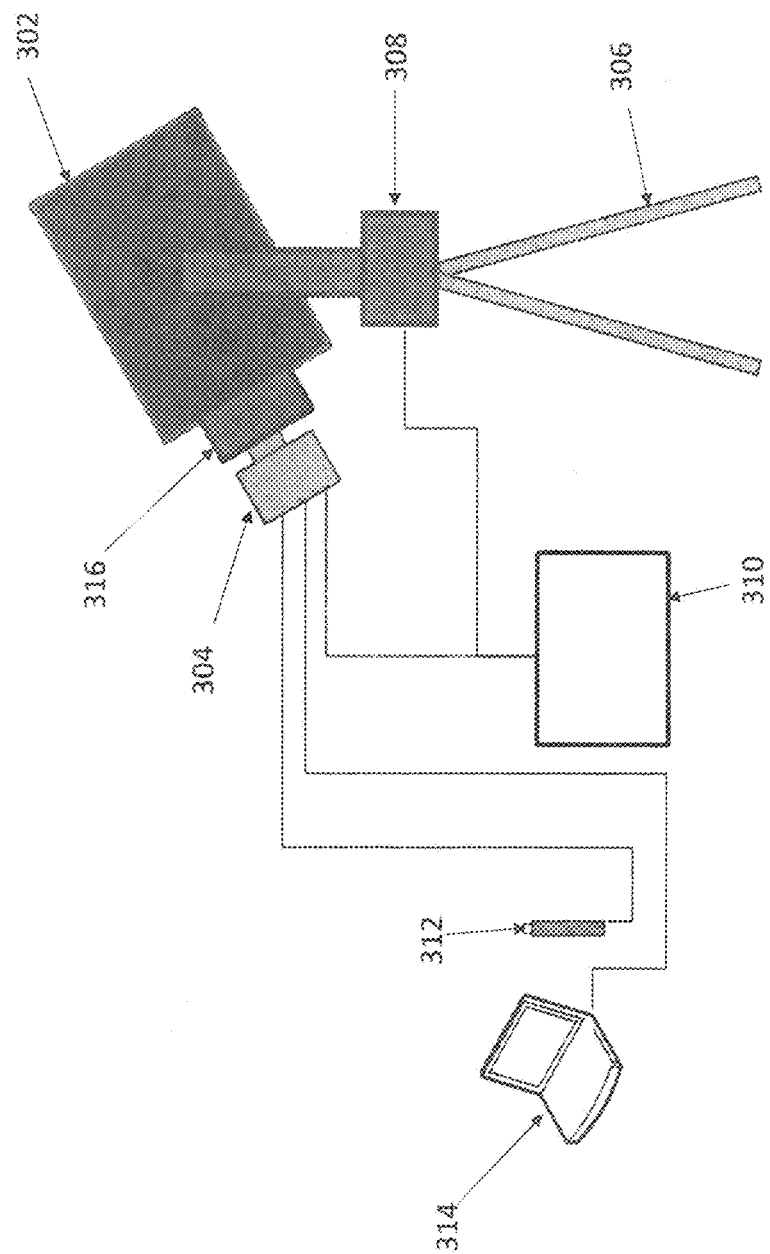
FIG. 3 depicts an embodiment of an imaging and processing system for an embodiment of the invention using the moon as a celestial object.

The imaging system 106 should be capable of taking images of the object 108 in front of the speckled background 104. FIGS. 2 and 3 disclose embodiments of the imaging system 106 used when the celestial object 102 is the sun and moon respectively. In a preferred embodiment of the invention, the imaging system 106 comprises a telescope 202/302 with a high-speed digital camera 204/304 affixed thereto. The telescope 202/302 may be selected by one skilled in the art, but examples of preferred telescopes 202/302 include a Celestron eight inch telescope for use with the moon as a celestial object 102 and a Vixen telescope for use with the sun as a celestial object 102. The camera 204/304 preferably is a high-speed, high-resolution camera. In a most preferred embodiment, the camera 204/304 is monochrome, but a color camera can be used in the present invention. The camera 204/304 needs to be capable of taking images of moving objects (such as aircraft or spacecraft) with the celestial object 102 behind said moving objects; hence, the speed of the camera must be sufficient to obtain such images before the moving object move away from the celestial object 102. Preferably, the resolution of the camera should exceed (1 megapixel) and the speed should exceed (100 frames per second).

In a more preferred embodiment, the telescope 202/302 is attached to a tripod 206/306 to hold the telescope 202/302 and camera 204/304 steady. The tripod 206/306 may include an auto-rotating mount 208/308 to enable a user to more easily and precisely align the telescope 202/302. The mount 208/308 is selected based on the size and weight of the telescope 202/302 and camera 204/304 being used. Examples of preferred mounts 208/308 include a Celestron auto-rotating mount for use with a Celestron eight inch telescope and a Meade motorized mount for use with a Vixen telescope.

A separate battery 210/310 may be attached to power the auto-rotating mount 208/308 and the camera 204/304. For most uses, a twelve volt battery is sufficient for these purposes. A remote camera trigger 212/312 may be attached to the camera 204/304 to allow a user to take images with the camera 204/304 without handling it directly. A remote 215 may also be included for the auto rotating mount 208. A storage/processing device 214/314 may be attached to view and store the images taken by the camera 204/304 and to process the images as discussed further below. In a preferred embodiment, the storage/processing device 214/314 is a laptop computer or the like. The laptop computer can be used to process the images taken by the camera 204/304 as discussed above or such processing can be done using a separate processing device.

In an embodiment of the invention, the imaging system 106 used when the celestial object 102 is the sun (see FIG. 2) includes a filter 216 placed between the camera 204 and the telescope 202. Because the sun does not possess a sufficiently speckled background 104 in the normal visual spectrum, the filter 216 should enable imaging of the granulation cells in the sun for use in the present invention. One preferred filter 216 is a calcium-K optical filter which only allows the 393.4 meter wavelength of light to pass through it, which is the wavelength of light emitted by ionized calcium atoms. These calcium atoms mainly exist in areas of the solar surface with strong magnetic fields, such as sun spots and granulation cells. Thus, this type of filter 216 allows the granulation cells and sun spots to be used to define a speckled background 104 for use in the present invention. One example of such a filter 216 is a Lunt B1200 calcium-K filter.

In a preferred embodiment of the invention using the sun as the celestial object 102, a focal extender 218 is placed between the telescope 202 and the camera 204 to increase magnification of the image which in turn increases the resolution of the background. An example of a preferred focal extender 218 is a Barlow Lens 2× focal extender.

In a preferred embodiment of the invention using the moon as the celestial object 102 (see FIG. 3), a focal reducer 316 is placed between the telescope 302 and the camera 304. The focal extender 316 is for the reduction of magnification to allow the entire image of the moon to fit within the image frame. In a preferred embodiment, a 60% focal extender is used.

Figure 5:
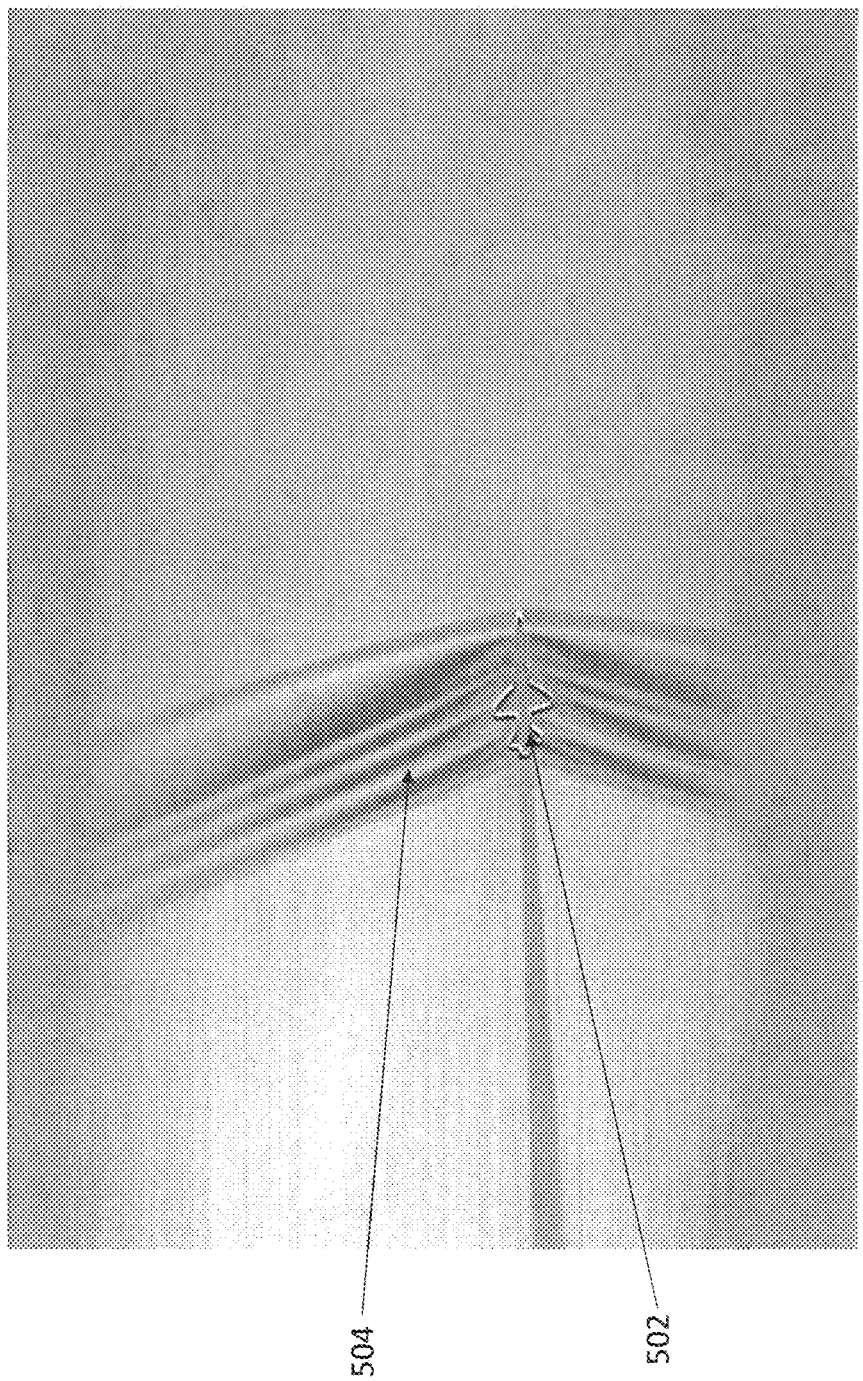
FIG. 5 depicts a processed image of an aircraft and the associated fluid flow around the aircraft using the present invention.

FIG. 5 depicts a processed image of a T-38 aircraft 502 obtained using the present invention with the sun as the celestial background. The aircraft 502 was flying at about 32,000 feet at a speed of about Mach 1.05. The actual distance from the aircraft 502 and the telescope was around 34,000 feet. As can be clearly seen, the fluid flow 504 around the aircraft 502 comes off both sides of the surfaces of the aircraft 502. The depicted image was obtained via processing one image of the background celestial object with 100 images of the fluid flow 504 of the aircraft 502 in front of the celestial object as described previously.

The invention also includes a method of visualizing fluid flow around an object as discussed below.

First, the imaging system discussed above is focused on a celestial object having a speckled background. Next, an image is taken of the celestial object, focused on the speckled background. Then, one or more images are taken of the fluid flow aligned between the imaging system and the celestial object. Finally, the first image is compared to the other image(s) to visualize the fluid flow (this processing can be done as discussed above).

What is described herein are specific examples of many possible variations on the same invention and are not intended in a limiting sense. The claimed invention can be practiced using other variations not specifically described above.

What is claimed is:

1. A system for visualizing fluid flow around an object in operation, comprising:
   an imaging system focused on a celestial body having a speckled background, wherein the fluid flow comprises a location between the speckled background and the imaging system; and,
   an image processing system capable of comparing an image of the speckled background with no fluid flow to one or more images of the fluid flow in front of the speckled background by obtaining a measurement of movement of pixel features in the speckled background between the images, created by light refracted by the fluid flow.

2. The system for visualizing fluid flow of claim 1, wherein the celestial object is selected from the sun and the moon.

3. The system for visualizing fluid flow of claim 2, wherein the celestial object comprises the sun.

4. The system for visualizing fluid flow of claim 3, wherein the imaging system includes a lens filter capable of creating the speckled background on the sun.

5. The system for visualizing fluid flow of claim 4, wherein the lens filter comprises a calcium-K optical filter.

6. The system for visualizing fluid flow of claim 1, wherein the comparison of images comprises aligning the speckled background of the celestial object in each image.

7. A method of visualizing fluid flow from an object in operation, comprising the steps of:
   providing an imaging system focused on a celestial object having a speckled background;
   taking an image of the celestial object, focused on the speckled background;
   taking one or more images of the fluid flow aligned between the imaging system and the speckled background; and,
   comparing the image of the speckled background with no fluid flow to the one or more images with fluid flow to visualize the fluid flow by obtaining a measurement of movement of pixel features in the speckled background between the images, created by light refracted by the fluid flow.

8. The method of visualizing fluid flow of claim 7, wherein the comparing step includes aligning the speckled backgrounds of the image of the celestial object with no fluid flow and the one or more images of the speckled background with fluid flow.

9. The method of visualizing fluid flow of claim 8, where the comparing step comprises using a method selected from cross-correlation and optical flow techniques.

10. The method of visualizing fluid flow of claim 7, wherein the imaging system creates the speckled background on the celestial object using a calcium-K optical filter.

* * * * *